US007520428B2

(12) United States Patent
Ishikawa

(10) Patent No.: US 7,520,428 B2

(45) Date of Patent: Apr. 21, 2009

(54) WIRELESS TAG COMMUNICATION CONTROL DEVICE

(75) Inventor: Atsushi Ishikawa, Izunokuni (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 40 days.

(21) Appl. No.: 11/369,511

(22) Filed: Mar. 6, 2006

(65) Prior Publication Data

US 2006/0213992 A1 Sep. 28, 2006

(30) Foreign Application Priority Data

Mar. 25, 2005 (JP) ............................ 2005-088898

(51) Int. Cl.
*G06K 5/00* (2006.01)

(52) U.S. Cl. ....................................... 235/382; 235/451

(58) Field of Classification Search ................. 119/840, 119/843; 235/384, 385, 375, 472.02, 382, 235/451

See application file for complete search history.

(56) References Cited

U.S. PATENT DOCUMENTS

| | | | | |
|---|---|---|---|---|
| 4,016,553 A * | 4/1977 | Novikoff et al. | ......... | 340/572.7 |
| 4,798,175 A * | 1/1989 | Townsend et al. | ........ | 340/572.7 |
| 6,042,008 A * | 3/2000 | Ando et al. | ................ | 235/384 |

FOREIGN PATENT DOCUMENTS

| | | |
|---|---|---|
| JP | 2004-260576 | 9/2004 |

* cited by examiner

*Primary Examiner*—Michael G Lee
*Assistant Examiner*—Rafferty Kelly
(74) *Attorney, Agent, or Firm*—Pearne & Gordon LLP

(57) ABSTRACT

The present invention provides a wireless tag communication control device, which includes a gate through which an object having attached thereto a wireless tag passes, a sensor that is arranged at the gate and senses the existence position of the object, an antenna that is arranged at the gate and transmits an electric wave to the wireless tag, and an electric wave output adjustment unit that is connected to the antenna, wherein an electric wave transmission output from the antenna is adjusted according to the position of the object in the gate.

6 Claims, 1 Drawing Sheet

WIRELESS TAG COMMUNICATION CONTROL DEVICE

CROSS-REFERENCE TO RELATED APPLICATIONS

This application is based upon and claims the benefit of priority from the prior Japanese Patent Application No. 2005-88898, filed on 25 Mar. 2005; the entire contents of which are incorporated herein by reference.

BACKGROUND OF THE INVENTION

1. Field of the Invention

The present invention relates to a wireless tag communication control device that enables most suitable communication when persons or objects having attached thereto a wireless tag pass through a communication gate that is placed at various facilities.

2. Description of the Related Art

In sorting persons or objects for transport which go into or go out of managed areas of various facilities, in various fields, there is widely utilized a system of attaching a wireless tag having stored therein inherent ID data to persons or objects in advance, and communicating with the wireless tag by transmitting an electric wave from an antenna installed at a gateway or a delivery path. On the other hand, distances between wireless tags and an antenna are coming to be elongated, and the output of an electric wave transmitted from an antenna is coming to be increased so as to ensure the communication.

However, an intensive electric wave having increased power is not desirable for persons in health, and there may be raised an adverse affect of bringing about a malfunction on various peripheral information processing devices. Furthermore, so as to cope with the situation in which visitation of persons cannot be predicted and the situation in which objects are transported in a random manner, a powerful electric wave is always transmitted from an antenna, which further enhances the anxiety of adverse affect due to such electric wave. So, there is a known technique of arranging a sensor for sensing visitation of persons before an antenna for communicating with wireless tags, halting the electric wave transmission from the antenna until the sensor senses a person, and starting the electric wave transmission from the antenna after the sensor senses a person (Jpn. Pat. Appln. Laid-Open Publication No. 2000-20648).

Employing the known method, since the electric wave transmission from the antenna is halted until the sensor senses a person, energy can be saved and an adverse affect exerted on peripheral information processing devices is reduced. On the other hand, since an electric wave of a predetermined output has to be always transmitted so that the communication can be properly performed after a person is sensed, it is difficult to remove the adverse affect by an electric wave radiated on persons.

BRIEF SUMMARY OF THE INVENTION

According to embodiments of the present invention, an object of the present invention is to provide a wireless tag communication control device that enables most suitable communication between wireless tags attached to objects and an antenna without transmitting an excessive electric wave.

The present invention may provide a wireless tag communication control device that communicates with a wireless tag attached to a moving object, comprising: a gate through which the object passes; a sensor for sensing the existence position of the object, the sensor being arranged at the gate; an antenna for transmitting an electric wave to the wireless tag, the antenna being arranged at the gate; and an electric wave output adjustment unit that is connected to the antenna; wherein an electric wave transmission output from the antenna is adjusted according to the position of the object in the gate.

DETAILED DESCRIPTION OF THE PREFERRED EMBODIMENTS

Figure 1:
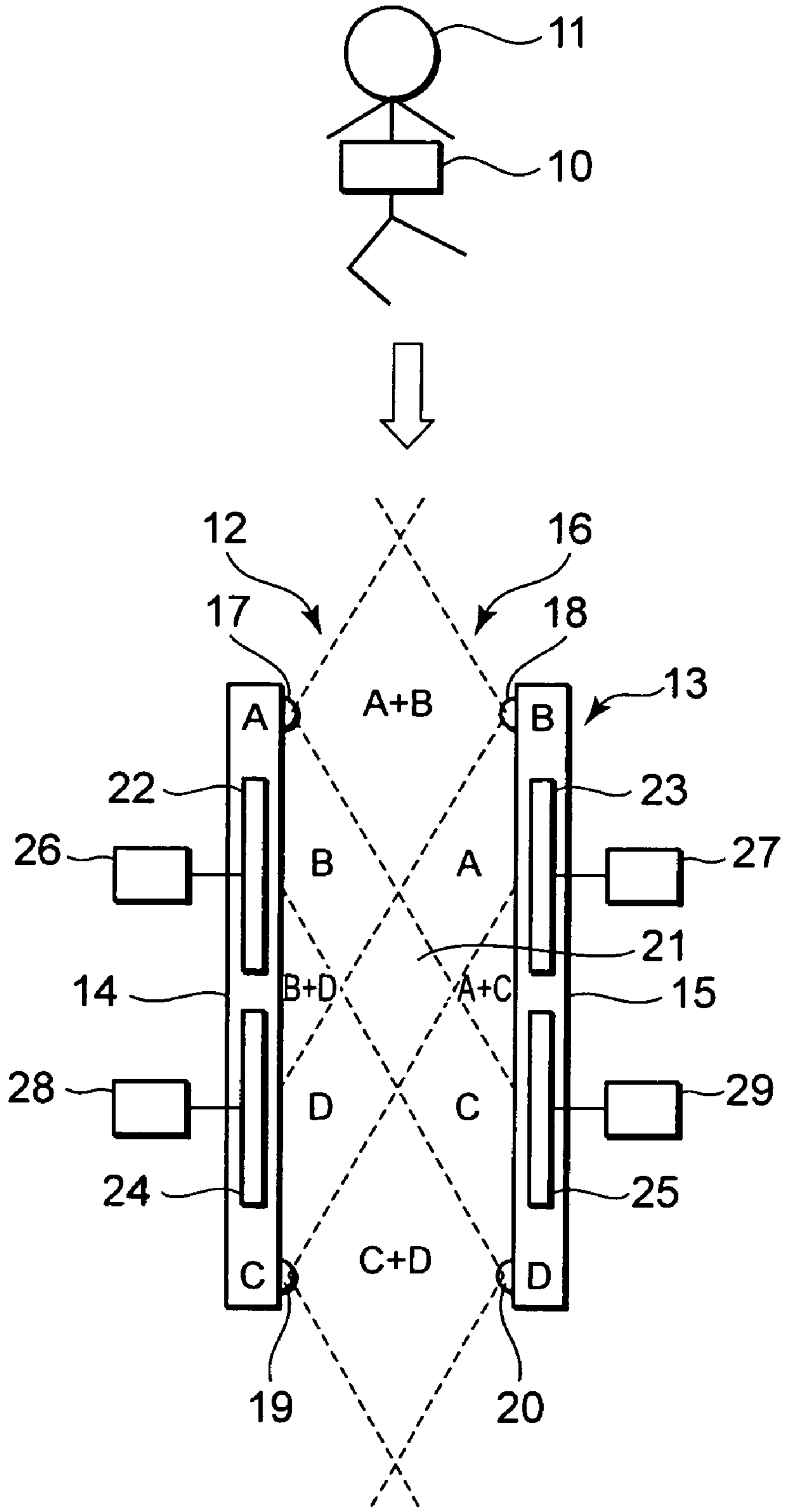
FIG. 1 shows a schematic view indicative of an embodiment of the present invention.

The present invention will further be described below with reference to the accompanying drawing. As shown in FIG. 1, when an object person 11 having attached thereto a wireless tag 10 passes through a gate 12, an antenna 13 placed at the gate 12 and the wireless tag 10 communicate with each other.

The gate 12 has a passage 16 that is sandwiched between a first partition wall 14 and a second partition wall 15. The object person 11 walks in a direction of an arrow shown in FIG. 1, and the entrance and the exit of the passage 16 are respectively the upper side and the lower side in FIG. 1. At the entrance ends and exit ends of the first and second partition walls 14, 15, sensors for sensing persons are arranged. That is, the entrance end of the first partition wall 14 has attached thereto a first sensor 17 shown by "A" in the drawing, the entrance end of the second partition wall 15 has attached thereto a second sensor 18 shown by "B" in the drawing, the exit end of the first partition wall 14 has attached thereto a third sensor 19 shown by "C" in the drawing, and the exit end of the second partition wall 15 has attached thereto a fourth sensor 20 shown by "D" in the drawing.

Those sensors 17 to 20, which are simply shown in the drawing, may be sensor systems such as an infrared ray system or a transmission system. When the object person 11 goes through the passage 16, these sensors operate to determine where the object person 11 is located in the passage 16.

That is, an area indicated by A+B shown in FIG. 1 is the area where the first sensor 17 and the second sensor 18 can equally sense the object person 11. An area indicated by only A is the area where the second sensor 18 cannot sense the object person 11, and only the first sensor 17 can sense the object person 11. The area A is located near the second partition wall 15 and away from the first partition wall 14. Similarly, an area indicated by only B is the area where the first sensor 17 cannot sense the object person 11, and only the second sensor 18 can sense the object person 11. The area B is located near the first partition wall 14 and away from the second partition wall 15.

Similarly, an area indicated by C+D shown in FIG. 1 is the area where the third sensor 19 and the fourth sensor 20 can equally sense the object person 11. An area indicated by only D is the area where only the fourth sensor 20 can sense the object person 11, while an area indicated by only C is the area where only the third sensor 19 can sense the object person 11. An area A+C is the area where the first sensor 17 and the third sensor 19 can sense the object person 11, while an area B+D is the area where the second sensor 18 and the fourth sensor 20 can sense the object person 11. A central area 21 located at the center of the passage 16, which is not indicated by any symbols, is the area where the object person 11 cannot be sensed by any sensors. After sensing that the object person 11 goes into the area A+B located at the entrance of the passage 16, when it is determined that the object person 11 cannot be sensed by any sensors, or is not located in any areas A to D, then it can be determined that the object person 11 is located in the central area 21. Furthermore, it is not difficult to sense the object person 11 located in the central area 21 using other sensors among various types of position-sensing sensors.

The first partition wall 14 and the second partition wall 15 have attached thereto antennas for transmitting electric waves so as to communicate with the wireless tag 10 of the object person 11. That is, the entrance side of the first partition wall 14 has attached thereto a first antenna 22, and the entrance side of the second partition wall 15 facing the first antenna 22 has attached thereto a second antenna 23. Similarly, the exit side of the first partition wall 14 has attached thereto a third antenna 24, and the exit side of the second partition wall 15 facing the third antenna 24 has attached thereto a fourth antenna 25. The respective antennas are connected to a transmission unit for radiating an electric wave for communication to the wireless tag 10, and to control unit, which are not shown.

The first to fourth antennas 22, 23, 24, 25 are connected to a first electric wave output adjustment unit 26, a second electric wave output adjustment unit 27, a third electric wave output adjustment unit 28, a fourth electric wave output adjustment unit 29, which adjust electric wave output respectively. These first to fourth electric wave output adjustment units 26 to 29 are provided with a function of individually adjusting the electric wave transmission output according to the existence position of the object person 11 within the passage 16 respectively, which will be explained later. These first to fourth electric wave output adjustment units 26 to 29 adjust the electric wave transmission output so that an electric wave of minimum output that can maintain the communication with the wireless tag 10 is transmitted to the wireless tag 10 even if the position of the object person 11 is changed within the passage 16, that is, irrespective of the position of the object person 11.

When entering into the passage 16, the object person 11 firstly goes into the area A+B. In this case, the first antenna 22 and the second antenna 23 transmit electric waves of equal output. Then, in case the object person 11 goes into the area A that is located near the second antenna 23 and away from the first antenna 22, the first electric wave output adjustment unit 26 and the second electric wave output adjustment unit 27 adjust the electric wave transmission output so as to enhance output from the first antenna 22 while lower output from the second antenna 23 so that an electric wave of a predetermined output can be transmitted to the wireless tag 10 without radiating an excessive electric wave on the object person 11.

When the object person 11 is located within the area A+B, area A, or area B, only the first antenna 22 and the second antenna 23 are made to operate, and transmission of electric wave by the third antenna 24 and fourth antenna 25 is halted.

In case outputs of the first antenna 22 and the second antenna 23 are made equal with each other even if the object person 11 goes into the area A, an electric wave of excessive output which is larger than a predetermined intensity is undesirably radiated on the object person 11 who is located near the second antenna 23.

On the other hand, in case the object person 11 goes into the area B, output from the first antenna 22 is lowered while output from the second antenna 23 is enhanced. In case the object person 11 goes into the area A+C, also the third antenna 24 and the fourth antenna 25 are made to operate, and outputs from the first antenna 22 and the third antenna 24 are enhanced while outputs from the second antenna 23 and the fourth antenna 25 are lowered.

Similarly, in case the object person 11 goes into the area B+D, outputs from the second antenna 23 and the fourth antenna 25 are enhanced while outputs from the first antenna 22 and the third antenna 24 are lowered. Even if an electric wave is transmitted from all the first to fourth antennas 22, 23, 24, 25, electric wave output radiated on the wireless tag 10 attached to the object person 11 is so adjusted as to be equal with electric wave output radiated on the wireless tag 10 using two antennas.

In case the object person 11 goes into the area C, area D, or area C+D, the first to fourth antennas are made to operate in a similar manner, and hence the detailed explanation will be omitted. In case the object person 11 goes into the central area 21 of the passage 16, the first to fourth antennas 22, 23, 24, 25 are made to radiate an electric wave of equal output. In this case, electric waves whose output is equal to that in other modes are transmitted to the wireless tag 10.

In this way, outputs from the first to fourth antennas 22, 23, 24, 25 are adjusted according to the position of the object person 11 having attached thereto the wireless tag 10. Accordingly, the intensity of electric waves that the wireless tag 10 receives, that is, the intensity of electric waves radiated on the object person 11 can be suppressed to the minimum of communicable range.

While the invention has been described hereinbefore, it should be understood that the invention is not limited to the embodiments, but various modifications, alternative constructions or equivalents can be implemented without departing from the scope and spirit of the present invention.

In above-described embodiment, four antennas are symmetrically arranged at both sides of the passage 16. Even if a single antenna is arranged at both sides, output of electric waves that the wireless tag 10 receives can always be suppressed to the minimum by lowering the output of electric wave when the object person 11 comes close to the antenna and enhancing the output of electric wave when the object person 11 gets away from the antenna. Therefore, similar control is possible, even if the number of antennas is two, or three.

What is claimed is:

1. A wireless tag communication control device that communicates with a wireless tag attached to a moving object, comprising:

a gate through which the object passes;

a sensor for sensing an existence position of the object, the sensor being arranged at the gate;

an antenna for transmitting an electric wave to the wireless tag, the antenna being arranged at the gate; and an electric wave output adjustment unit that is connected to the antenna;

wherein an electric wave transmission output from the antenna is adjusted according to the existence position of the object in the gate so that said output is adjusted to a minimum electric wave transmission output for maintaining a communication with the wireless tag.

2. The wireless tag communication control device as set forth in claim 1, wherein the sensor has a plurality of sensors, and the sensors sense the existence position of the object at different areas in the gate respectively.

3. The wireless tag communication control device as set forth in claim 1 or 2, wherein the antenna has a plurality of antennas, and electric wave transmission outputs from the plural antennas are controlled according to the position of the object in the gate respectively.

4. A wireless tag communication control device that communicates with a wireless tag attached to a moving object, comprising:

a first sensor and a second sensor for sensing an existence position of the moving object, the first and second sensors facing each other;

a first antenna and a second antenna for transmitting an electric wave to the wireless tag, the first and second antennas facing each other;

a first electric wave output adjustment unit connected to the first antenna; and a second electric wave output adjustment unit connected to the second antenna;

wherein electric wave transmission outputs from the first and second antennas are adjusted according to the existence position of the object so that said outputs are adjusted to minimum electric wave transmission outputs for maintaining a communication with the wireless tag.

5. A wireless tag communication control device that communicates with a wireless tag attached to a moving object, comprising:

a first partition wall and a second partition wall which face each other;

a first sensor and a second sensor for sensing an existence position of the object, the first and second sensors being arranged at one ends of the first and second partition walls respectively;

a third sensor and a fourth sensor for sensing the existence position of the object, the third and fourth sensors being arranged at the other ends of the first and second partition walls respectively;

a first antenna and a third antenna which are arranged at the first partition wall;

a second antenna and a fourth antenna which are arranged at the second partition wall, the second and fourth antennas facing the first and third antennas respectively; and a first to a fourth electric wave output adjustment units which are connected to the first to fourth antennas;

wherein electric wave transmission outputs from the first to fourth antennas are adjusted according to the existence position of the object so that said outputs are adjusted to minimum electric wave transmission outputs for maintaining a communication with the wireless tag.

6. The wireless tag communication control device as set forth in claim 5, wherein the first and third antennas are arranged between the first and third sensors, and the second and fourth antennas are arranged between the second and fourth sensors.

* * * * *